United States Patent
Preuss et al.

(10) Patent No.: US 9,932,861 B2
(45) Date of Patent: Apr. 3, 2018

(54) SYSTEMS AND METHODS FOR CONTROLLING BACKPRESSURE IN A HEAT ENGINE SYSTEM HAVING HYDROSTAIC BEARINGS

(71) Applicant: ECHOGEN POWER SYSTEMS LLC, Akron, OH (US)

(72) Inventors: Jason Lee Preuss, Lakewood, CO (US); Timothy J. Held, Akron, OH (US)

(73) Assignee: ECHOGEN POWER SYSTEMS LLC, Akron, OH (US)

( * ) Notice: Subject to any disclaimer, the term of this patent is extended or adjusted under 35 U.S.C. 154(b) by 0 days.

(21) Appl. No.: 15/308,628

(22) PCT Filed: Jun. 12, 2015

(86) PCT No.: PCT/US2015/035589
§ 371 (c)(1),
(2) Date: Nov. 3, 2016

(87) PCT Pub. No.: WO2015/192024
PCT Pub. Date: Dec. 17, 2015

(65) Prior Publication Data
US 2017/0191379 A1    Jul. 6, 2017

Related U.S. Application Data
(60) Provisional application No. 62/011,690, filed on Jun. 13, 2014.

(51) Int. Cl.
*F01D 15/08*    (2006.01)
*F01D 25/22*    (2006.01)
(Continued)

(52) U.S. Cl.
CPC ............. *F01D 25/22* (2013.01); *F01D 15/08* (2013.01); *F01D 25/16* (2013.01); *F01K 13/02* (2013.01);
(Continued)

(58) Field of Classification Search
CPC .. F16C 32/06; F16C 32/0655; F16C 32/0622; F16C 32/0681; F16C 2360/45;
(Continued)

(56) References Cited

U.S. PATENT DOCUMENTS

| | | |
|---|---|---|
| 4,884,942 A | 12/1989 | Pennink |
| 5,131,318 A * | 7/1992 | Kimura ................... F15B 11/06 |
| | | 137/596.16 |

(Continued)

FOREIGN PATENT DOCUMENTS

| | | | |
|---|---|---|---|
| CA | 2952379 A1 * | 12/2015 | ............. F01D 25/16 |
| EP | 0769111 A1 | 4/1997 | |

(Continued)

OTHER PUBLICATIONS

PCT International Search Report and Written Opinion dated Aug. 27, 2015 corresponding to PCT Application PCT/US2015/035589 filed Jun. 12, 2015. (11 pages).

*Primary Examiner* — Marcus Charles

(57) ABSTRACT

A method includes controlling a bearing fluid supply system to provide the bearing fluid to a hydrostatic bearing of the turbopump assembly. The bearing fluid includes a supercritical working fluid. The method also includes receiving data corresponding to a pressure of the bearing fluid measured at or near a bearing fluid drain fluidly coupled to the hydrostatic bearing, determining a thermodynamic state of the bearing fluid at or near the bearing fluid drain based at least in part on the received data, and controlling a backpressure regulation valve to throttle the backpressure regu- (Continued)

lation valve between an opened position and a closed position to regulate a backpressure in a bearing fluid discharge line to maintain the bearing fluid in a supercritical state in the hydrostatic bearing and/or at or near the bearing fluid drain.

5 Claims, 3 Drawing Sheets

(51) Int. Cl.
  *F01K 25/10*  (2006.01)
  *F16C 32/06*  (2006.01)
  *F01K 13/02*  (2006.01)
  *F01K 23/10*  (2006.01)
  *F01D 25/16*  (2006.01)
  *F01K 25/08*  (2006.01)
  *F04C 29/12*  (2006.01)

(52) U.S. Cl.
  CPC .............. *F01K 23/10* (2013.01); *F01K 25/08* (2013.01); *F01K 25/103* (2013.01); *F04C 29/12* (2013.01); *F16C 32/06* (2013.01)

(58) Field of Classification Search
  CPC .......... F01D 15/08; F01D 25/16; F01D 25/22; F01K 13/02; F01K 23/10; F01K 25/08; F01K 25/103; F04C 29/122; F04C 29/224; F04C 29/124
  USPC ............ 384/100, 99, 114; 60/653, 660, 670; 417/370; 415/172.1
  See application file for complete search history.

(56) References Cited

U.S. PATENT DOCUMENTS

| | | | | |
|---|---|---|---|---|
| 5,921,165 | A | * | 7/1999 | Takahashi .............. E02F 9/226 91/426 |
| 2004/0247211 | A1 | | 12/2004 | Hamke |
| 2007/0292283 | A1 | | 12/2007 | Oklejas |
| 2012/0070108 | A1 | | 3/2012 | Kashchenevsky |
| 2012/0177476 | A1 | * | 7/2012 | Jones ..................... F02B 39/14 415/1 |
| 2013/0036736 | A1 | | 2/2013 | Hart et al. |
| 2014/0096521 | A1 | | 4/2014 | Held et al. |
| 2014/0208750 | A1 | * | 7/2014 | Vermeersch ........... F01K 13/02 60/646 |

FOREIGN PATENT DOCUMENTS

| | | | | |
|---|---|---|---|---|
| JP | S59123693 | A | | 7/1984 |
| JP | 04116285 | A | * | 4/1992 |
| JP | H10292817 | A | | 11/1998 |
| JP | 2005032818 | A | * | 2/2005 ............. F16C 29/025 |
| WO | WO-9106772 | A1 | * | 5/1991 .......... F04C 29/0007 |
| WO | WO-2010087179 | A1 | * | 8/2010 .......... F04C 18/0215 |
| WO | 2014059235 | A1 | | 4/2014 |
| WO | WO-2014160257 | A1 | * | 10/2014 ............... F01K 7/32 |

* cited by examiner

SYSTEMS AND METHODS FOR CONTROLLING BACKPRESSURE IN A HEAT ENGINE SYSTEM HAVING HYDROSTAIC BEARINGS

CROSS REFERENCE TO RELATED APPLICATIONS

This application claims priority to U.S. Provisional Patent Application having Ser. No. 62/011,690, which was filed Jun. 13, 2014. The aforementioned patent application is hereby incorporated by reference in its entirety into the present application to the extent consistent with the present application.

BACKGROUND

Waste heat is often created as a byproduct of industrial processes where flowing streams of high-temperature liquids, gases, or fluids must be exhausted into the environment or removed in some way in an effort to maintain the operating temperatures of the industrial process equipment. Some industrial processes utilize heat exchanger devices to capture and recycle waste heat back into the process via other process streams. However, the capturing and recycling of waste heat is generally infeasible by industrial processes that utilize high temperatures or have insufficient mass flow or other unfavorable conditions.

Waste heat can be converted into useful energy by a variety of turbine generator or heat engine systems that employ thermodynamic methods, such as Rankine cycles. Rankine cycles and similar thermodynamic methods are typically steam-based processes that recover and utilize waste heat to generate steam for driving a turbine, turbo, or other expander connected to an electric generator or pump. An organic Rankine cycle utilizes a lower boiling-point working, fluid, instead of water, during a traditional Rankine cycle. Exemplary lower boiling-point working fluids include hydrocarbons, such as light hydrocarbons (e.g., propane or butane) and halogenated hydrocarbons, such as hydrochlorofluorocarbons (HCFCs) or hydrofluorocarbons (HFCs) (e.g., R245fa). More recently, in view of issues such as thermal instability, toxicity, flammability, and production cost of the lower boiling-point working fluids, some thermodynamic cycles have been modified to circulate non-hydrocarbon working fluids, such as ammonia.

The heat engine systems often utilize a turbopump to circulate the working fluid that captures the waste heat. The turbopump, as well as other rotating equipment used in the systems, typically generates thrust and other loads that arise in the system during operation and need to be minimized to reduce damage to system components. One way to handle the thrust and other load imbalances in the system is to utilize bearings, such as hydrostatic bearings, to absorb the excessive loads. In high density machinery operating with supercritical fluids, such as supercritical carbon dioxide, it may be desirable to operate the hydrostatic bearings with liquid or supercritical fluid. However, the supercritical fluid is heated as it is circulated through the bearings of the turbopump and, when drained, may experience a large pressure drop. This pressure drop may lead to erosion and/or cavitation of various components of the turbopump, thereby increasing component wear.

Therefore, there is a need for systems and methods that enable use of a supercritical fluid in the bearings of a heat engine system while reducing or eliminating the likelihood of erosion and/or cavitation.

SUMMARY

In one embodiment, a method is provided for controlling flow of a bearing fluid to a turbopump assembly. The method includes controlling a bearing fluid supply system to provide the bearing fluid to a hydrostatic bearing of the turbopump assembly. The bearing fluid includes a supercritical working fluid. The method also includes receiving data corresponding to a pressure of the bearing fluid measured at or near a bearing fluid drain fluidly coupled to the hydrostatic bearing, determining a thermodynamic state of the bearing fluid at or near the bearing fluid drain based at least in part on the received data, and controlling a backpressure regulation valve to throttle the backpressure regulation valve between an opened position and a closed position to regulate a backpressure in a bearing fluid discharge line to maintain the bearing fluid in a supercritical state in the hydrostatic bearing and/or at or near the bearing fluid drain.

In another embodiment, a turbopump system includes a pump including at least one hydrostatic bearing, disposed between a high pressure side and a low pressure side of a working fluid circuit, and configured to circulate a working fluid through the working fluid circuit. At least a portion of the working fluid is in a supercritical state. A bearing fluid supply source is fluidly coupled to the at least one hydrostatic bearing and configured to supply a bearing fluid to the at least one hydrostatic bearing. The bearing fluid includes the working fluid in the supercritical state. A backpressure regulation valve is disposed downstream of the at least one hydrostatic bearing and fluidly coupled with a bearing fluid discharge line, the backpressure regulation valve configured to be throttled between an opened position and a closed position to regulate a backpressure of the bearing fluid along the bearing fluid discharge line to maintain the bearing fluid in the supercritical state in the bearing fluid discharge line.

In another embodiment, a turbopump system includes a pump fluidly coupled to a working fluid circuit between a low pressure side and a high pressure side of the working fluid circuit, and being configured to circulate the working fluid within the working fluid circuit, the pump having at least one hydrostatic bearing configured to receive the working fluid in a supercritical state. A backpressure regulation valve is disposed downstream from the at least one hydrostatic bearing and fluidly coupled with a bearing fluid discharge line. The backpressure regulation valve is configured to be throttled to regulate a backpressure of the working fluid along the bearing fluid discharge line to maintain the working fluid in the supercritical state in the bearing fluid discharge line.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

As described in more detail below, presently disclosed embodiments are directed to systems and methods for efficiently transforming thermal energy of a heat stream (e.g., a waste heat stream) into electrical energy. The provided embodiments may enable the reduction or prevention of damage to components of the heat engine system due to pressure drops near a hydrostatic bearing drain. For example, in some embodiments, a heat engine system is configured to maintain a working fluid (e.g., sc-$CO_2$) within the low pressure side of a working fluid circuit in a supercritical state during some or all of the operational period of the working fluid circuit. In such embodiments, one or more hydrostatic bearings in the heat engine system may be configured to run on liquid and/or supercritical fluid, and large pressure drops near the drain exit of the hydrostatic bearings may be reduced or eliminated by backpressuring the hydrostatic bearings to an intermediate pressure. To that end, certain embodiments include a backpressure regulation valve disposed along a bearing fluid discharge line and controllable to regulate the backpressure in the bearing fluid discharge line. By controlling the backpressure in this manner, the likelihood of surface erosion and/or pump cavitation may be reduced or eliminated as compared to systems without backpressure regulation techniques. These and other features of presently disclosed embodiments are discussed in more detail below.

Figure 1:
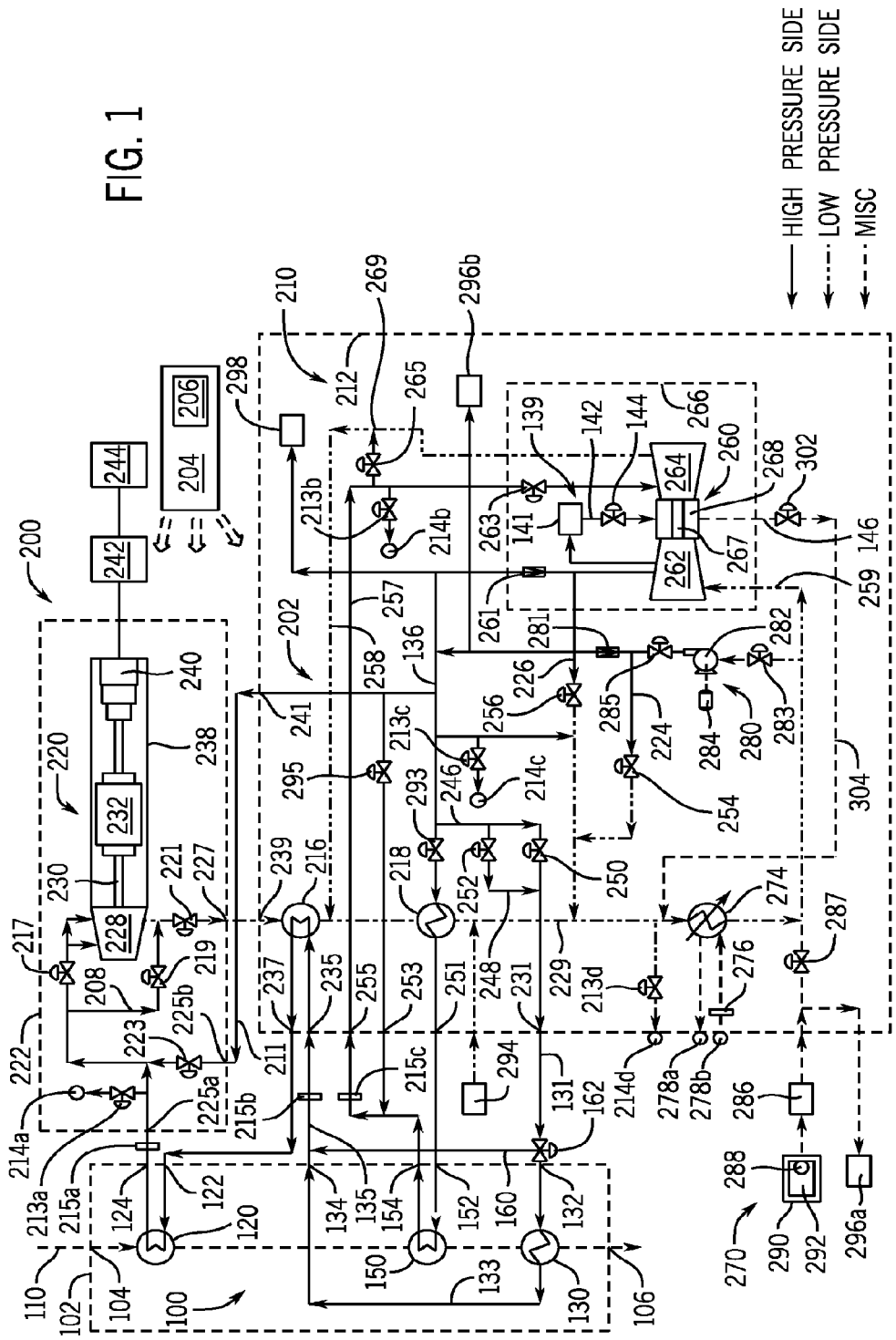
FIG. 1 illustrates an embodiment of a heat engine system, according to one or more embodiments disclosed herein.

Turning now to the drawings, FIG. 1 illustrates an embodiment of a heat engine system 200, which may also be referred to as a thermal engine system, an electrical generation system, a waste heat or other heat recovery system, and/or a thermal to electrical energy system, as described in one or more embodiments below. The heat engine system 200 is generally configured to encompass one or more elements of a Rankine cycle, a derivative of a Rankine cycle, or another thermodynamic cycle for generating electrical energy from a wide range of thermal sources. The heat engine system 200 includes a waste heat system 100 and a power generation system 220 coupled to and in thermal communication with each other via a working fluid circuit 202 disposed within a process system 210.

During operation, a working fluid, such as supercritical carbon dioxide (sc-$CO_2$), is circulated through the working fluid circuit 202, and heat is transferred to the working fluid from a heat source stream 110 flowing through the waste heat system 100. Once heated, the working fluid is circulated through a power turbine 228 within the power generation system 220 where the thermal energy contained in the heated working fluid is converted to mechanical energy. In this way, the process system 210, the waste heat system 100, and the power generation system 220 cooperate to convert the thermal energy in the heat source stream 110 into mechanical energy, which may be further converted into electrical energy if desired, depending on implementation-specific considerations.

More specifically, in the embodiment of FIG. 1, the waste heat system 100 contains three heat exchangers (i.e., the heat exchangers 120, 130, and 150) fluidly coupled to a high pressure side of the working fluid circuit 202 and in thermal communication with the heat source stream 110. Such thermal communication provides the transfer of thermal energy from the heat source stream 110 to the working fluid flowing throughout the working fluid circuit 202. In one or more embodiments disclosed herein, two, three, or more heat exchangers may be fluidly coupled to and in thermal communication with the working fluid circuit 202, such as a primary heat exchanger, a secondary heat exchanger, a tertiary heat exchanger, respectively the heat exchangers 120, 150, and 130. For example, the heat exchanger 120 may be the primary heat exchanger fluidly coupled to the working fluid circuit 202 upstream of an inlet of the power turbine 228, the heat exchanger 150 may be the secondary heat exchanger fluidly coupled to the working fluid circuit 202 upstream of an inlet of the drive turbine 264 of the turbine pump 260, and the heat exchanger 130 may be the tertiary heat exchanger fluidly coupled to the working fluid circuit 202 upstream of an inlet of the heat exchanger 120. However, it should be noted that in other embodiments, any desired number of heat exchangers, not limited to three, may be provided in the waste heat system 100.

Further, the waste heat system 100 also contains an inlet 104 for receiving the heat source stream 110 and an outlet 106 for passing the heat source stream 110 out of the waste heat system 100. The heat source stream 110 flows through and from the inlet 104, through the heat exchanger 120, through one or more additional heat exchangers, if fluidly coupled to the heat source stream 110, and to and through the outlet 106. In some examples, the heat source stream 110 flows through and from the inlet 104, through the heat exchangers 120, 150, and 130, respectively, and to and through the outlet 106. The heat source stream 110 may be routed to flow through the heat exchangers 120, 130, 150, and/or additional heat exchangers in other desired orders.

In some embodiments described herein, the waste heat system 100 is disposed on or in a waste heat skid 102 fluidly coupled to the working fluid circuit 202, as well as other portions, sub-systems, or devices of the heat engine system 200. The waste heat skid 102 may be fluidly coupled to a source of and an exhaust for the heat source stream 110, a main process skid 212, a power generation skid 222, and/or other portions, sub-systems, or devices of the heat engine system 200.

In one or more configurations, the waste heat system 100 disposed on or in the waste heat skid 102 generally contains inlets 122, 132, and 152 and outlets 124, 134, and 154 fluidly coupled to and in thermal communication with the working fluid within the working fluid circuit 202. The inlet 122 is disposed upstream of the heat exchanger 120, and the outlet 124 is disposed downstream from the heat exchanger 120. The working fluid circuit 202 is configured to flow the working fluid from the inlet 122, through the heat exchanger 120, and to the outlet 124 while transferring thermal energy from the heat source stream 110 to the working fluid by the heat exchanger 120. The inlet 152 is disposed upstream of the heat exchanger 150, and the outlet 154 is disposed downstream from the heat exchanger 150. The working fluid circuit 202 is configured to flow the working fluid from the inlet 152, through the heat exchanger 150, and to the outlet 154 while transferring thermal energy from the heat source stream 110 to the working fluid by the heat exchanger 150. The inlet 132 is disposed upstream of the heat exchanger 130, and the outlet 134 is disposed downstream from the heat exchanger 130. The working fluid circuit 202 is configured to flow the working fluid from the inlet 132, through the heat exchanger 130, and to the outlet 134 while transferring thermal energy from the heat source stream 110 to the working fluid by the heat exchanger 130.

The heat source stream 110 that flows through the waste heat system 100 may be a waste heat stream such as, but not limited to, a gas turbine exhaust stream, an industrial process exhaust stream, or any other combustion product exhaust stream, such as a furnace or boiler exhaust stream. The heat source stream 110 may be at a temperature within a range from about 100° C. to about 1,000° C., or greater than 1,000° C., and in some examples, within a range from about 200° C. to about 800° C., more narrowly within a range from about 300° C. to about 600° C. The heat source stream 110 may contain air, carbon dioxide, carbon monoxide, water or steam, nitrogen, oxygen, argon, derivatives thereof, or mixtures thereof. In some embodiments, the heat source stream 110 may derive thermal energy from renewable sources of thermal energy, such as solar or geothermal sources.

Turning now to the power generation system 220, the illustrated embodiment includes the power turbine 228 disposed between a high pressure side and a low pressure side of the working fluid circuit 202. The power turbine 228 is configured to convert thermal energy to mechanical energy by a pressure drop in the working fluid flowing between the high and the low pressure sides of the working fluid circuit 202. A power generator 240 is coupled to the power turbine 228 and configured to convert the mechanical energy into electrical energy. In certain embodiments, a power outlet 242 may be electrically coupled to the power generator 240 and configured to transfer the electrical energy from the power generator 240 to an electrical grid 244. The illustrated power generation system 220 also contains a driveshaft 230 and a gearbox 232 coupled between the power turbine 228 and the power generator 240.

In one or more configurations, the power generation system 220 is disposed on or in the power generation skid 222 that contains inlets 225a, 225b and an outlet 227 fluidly coupled to and in thermal communication with the working fluid within the working fluid circuit 202. The inlets 225a, 225b are upstream of the power turbine 228 within the high pressure side of the working fluid circuit 202 and are configured to receive the heated and high pressure working fluid. In some examples, the inlet 225a may be fluidly coupled to the outlet 124 of the waste heat system 100 and configured to receive the working fluid flowing from the heat exchanger 120. Further, the inlet 225b may be fluidly coupled to the outlet 241 of the process system 210 and configured to receive the working fluid flowing from the turbopump 260 and/or the start pump 280. The outlet 227 is disposed downstream from the power turbine 228 within the low pressure side of the working fluid circuit 202 and is configured to provide the low pressure working fluid. In some examples, the outlet 227 may be fluidly coupled to the inlet 239 of the process system 210 and configured to flow the working fluid to the recuperator 216.

A filter 215a may be disposed along and in fluid communication with the fluid line at a point downstream from the heat exchanger 120 and upstream of the power turbine 228. In some examples, the filter 215a is fluidly coupled to the working fluid circuit 202 between the outlet 124 of the waste heat system 100 and the inlet 225a of the process system 210.

Again, the portion of the working fluid circuit 202 within the power generation system 220 is fed the working fluid by the inlets 225a and 225b. Additionally, a power turbine stop valve 217 is fluidly coupled to the working fluid circuit 202 between the inlet 225a and the power turbine 228. The power turbine stop valve 217 is configured to control the working fluid flowing from the heat exchanger 120, through the inlet 225a, and into the power turbine 228 while in an opened position. Alternatively, the power turbine stop valve 217 may be configured to cease the flow of working fluid from entering into the power turbine 228 while in a closed position.

A power turbine attemperator valve 223 is fluidly coupled to the working fluid circuit 202 via an attemperator bypass line 211 disposed between the outlet on the pump portion 262 of the turbopump 260 and the inlet on the power turbine 228 and/or disposed between the outlet on the pump portion 282 of the start pump 280 and the inlet on the power turbine 228. The attemperator bypass line 211 and the power turbine attemperator valve 223 may be configured to flow the working fluid from the pump portion 262 or 282, around and avoid the recuperator 216 and the heat exchangers 120 and 130, and to the power turbine 228, such as during a warm-up or cool-down step. The attemperator bypass line 211 and the power turbine attemperator valve 223 may be utilized to warm the working fluid with heat coming from the power turbine 228 while avoiding the thermal heat from the heat source stream 110 flowing through the heat exchangers, such as the heat exchangers 120 and 130. In some examples, the power turbine attemperator valve 223 may be fluidly coupled to the working fluid circuit 202 between the inlet 225b and the power turbine stop valve 217 upstream of a point on the fluid line that intersects the incoming stream from the inlet 225a. The power turbine attemperator valve 223 may be configured to control the working fluid flowing from the start pump 280 and/or the turbopump 260, through the inlet 225b, and to a power turbine stop valve 217, the power turbine bypass valve 219, and/or the power turbine 228.

The power turbine bypass valve 219 is fluidly coupled to a turbine bypass line that extends from a point of the working fluid circuit 202 upstream of the power turbine stop valve 217 and downstream from the power turbine 228. Therefore, the bypass line and the power turbine bypass valve 219 are configured to direct the working fluid around and avoid the power turbine 228. If the power turbine stop valve 217 is in a closed position, the power turbine bypass valve 219 may be configured to flow the working fluid around and avoid the power turbine 228 while in an opened position. In one embodiment, the power turbine bypass valve 219 may be utilized while warming up the working fluid during a startup operation of the electricity generating process. An outlet valve 221 is fluidly coupled to the working fluid circuit 202 between the outlet on the power turbine 228 and the outlet 227 of the power generation system 220.

Turning now to the process system 210, in one or more configurations, the process system 210 is disposed on or in the main process skid 212 and includes inlets 235, 239, and 255 and outlets 231, 237, 241, 251, and 253 fluidly coupled to and in thermal communication with the working fluid within the working fluid circuit 202. The inlet 235 is upstream of the recuperator 216 and the outlet 154 is downstream from the recuperator 216. The working fluid circuit 202 is configured to flow the working fluid from the inlet 235, through the recuperator 216, and to the outlet 237 while transferring thermal energy from the working fluid in the low pressure side of the working fluid circuit 202 to the working fluid in the high pressure side of the working fluid circuit 202 by the recuperator 216. The outlet 241 of the process system 210 is downstream from the turbopump 260 and/or the start pump 280, upstream of the power turbine 228, and configured to provide a flow of the high pressure working fluid to the power generation system 220, such as to the power turbine 228. The inlet 239 is upstream of the recuperator 216, downstream from the power turbine 228, and configured to receive the low pressure working fluid flowing from the power generation system 220, such as to the power turbine 228. The outlet 251 of the process system 210 is downstream from the recuperator 218, upstream of the heat exchanger 150, and configured to provide a flow of working fluid to the heat exchanger 150. The inlet 255 is downstream from the heat exchanger 150, upstream of the drive turbine 264 of the turbopump 260, and configured to provide the heated high pressure working fluid flowing from the heat exchanger 150 to the drive turbine 264 of the turbopump 260. The outlet 253 of the process system 210 is downstream from the pump portion 262 of the turbopump 260 and/or the pump portion 282 of the start pump 280, couples a bypass line disposed downstream from the heat exchanger 150 and upstream of the drive turbine 264 of the turbopump 260, and is configured to provide a flow of working fluid to the drive turbine 264 of the turbopump 260.

Additionally, a filter 215c may be disposed along and in fluid communication with the fluid line at a point downstream from the heat exchanger 150 and upstream of the drive turbine 264 of the turbopump 260. In some examples, the filter 215c is fluidly coupled to the working fluid circuit 202 between the outlet 154 of the waste heat system 100 and the inlet 255 of the process system 210. Further, a filter 215b may be disposed along and in fluid communication with the fluid line 135 at a point downstream from the heat exchanger 130 and upstream of the recuperator 216. In some examples, the filter 215b is fluidly coupled to the working fluid circuit 202 between the outlet 134 of the waste heat system 100 and the inlet 235 of the process system 210.

In certain embodiments, as illustrated in FIG. 1, the process system 210 may be disposed on or in the main process skid 212, the power generation system 220 may be disposed on or in a power generation skid 222, and the waste heat system 100 may be disposed on or in a waste heat skid 102. In these embodiments, the working fluid circuit 202 extends throughout the inside, the outside, and between the main process skid 212, the power generation skid 222, and the waste heat skid 102, as well as other systems and portions of the heat engine system 200. Further, in some embodiments, the heat engine system 200 includes the heat exchanger bypass line 160 and the heat exchanger bypass valve 162 disposed between the waste heat skid 102 and the main process skid 212 for the purpose of routing the working fluid away from one or more of the heat exchangers during startup to reduce or eliminate component wear and/or damage.

Turning now to features of the working fluid circuit 202, the working fluid circuit 202 contains the working fluid (e.g., sc-$CO_2$) and has a high pressure side and a low pressure side. FIG. 1 depicts the high and low pressure sides of the working fluid circuit 202 of the heat engine system 200 by representing the high pressure side with "_____" and the low pressure side with " . . . " as described in one or more embodiments. In certain embodiments, the working fluid circuit 202 includes one or more pumps, such as the illustrated turbopump 260 and start pump 280. The turbopump 260 and the start pump 280 are operative to pressurize and circulate the working fluid throughout the working fluid circuit 202 and may each be an assembly of components that form the turbopump 260 or the start pump 280.

The turbopump 260 may be a turbo-drive pump or a turbine-drive pump and, in some embodiments, may form a pump assembly having a pump portion 262 and a drive turbine 264 coupled together by a driveshaft 267 and an optional gearbox. The driveshaft 267 may be a single shaft or may contain two or more shafts coupled together. In one example, a first segment of the driveshaft 267 extends from the drive turbine 264 to the gearbox, a second segment of the driveshaft 230 extends from the gearbox to the pump portion 262, and multiple gears are disposed between and couple to the two segments of the driveshaft 267 within the gearbox.

The drive turbine 264 is configured to rotate the pump portion 262 and the pump portion 262 is configured to circulate the working fluid within the working fluid circuit 202. Accordingly, the pump portion 262 of the turbopump 260 may be disposed between the high pressure side and the low pressure side of the working fluid circuit 202. The pump inlet on the pump portion 262 is generally disposed in the low pressure side, and the pump outlet on the pump portion 262 is generally disposed in the high pressure side. The drive turbine 264 of the turbopump 260 may be fluidly coupled to the working fluid circuit 202 downstream from the heat exchanger 150, and the pump portion 262 of the turbopump 260 is fluidly coupled to the working fluid circuit 202 upstream of the heat exchanger 120 for providing the heated working fluid to the turbopump 260 to move or otherwise power the drive turbine 264.

Further, in the illustrated embodiment, a bearing fluid supply system 139 supplies a bearing fluid to one or more bearings (e.g., hydrostatic bearing 374) in the turbopump 260. In some embodiments, the bearing fluid supply system 139 may include a bearing fluid supply source 141, a bearing fluid supply line 142, a bearing fluid supply valve 144, a bearing housing 268, a bearing fluid discharge line 304, and a backpressure regulation valve 302. In the illustrated embodiment, the bearing fluid supply source 141 is fluidly coupled to a bearing housing 268 of the turbopump 260 by the bearing fluid supply line 142. The flow of the bearing fluid into the bearing housing 268 may be controlled via the bearing fluid supply valve 144 that is operatively coupled to the bearing fluid supply line 142 and controlled by the process control system 204. Likewise, the flow of the bearing fluid from the bearing housing 268 may be controlled via the backpressure regulation valve 302 that is operatively coupled to the bearing fluid discharge line 304 and controlled by the process control system 204.

During operation, the bearing fluid generally flows from the bearing fluid supply source 141, through the bearing fluid supply valve 144, through the bearing housing 268, and to the bearing fluid discharge line 304. In the illustrated embodiment, the bearing fluid discharge line 304 is fluidly coupled to the low pressure side of the working fluid circuit 202 at a location upstream of the condenser 274. However, it should be noted that in other embodiments, the bearing fluid discharge line 304 may be coupled to the low pressure side at any desired location, not limited to that shown in FIG. 1.

In the illustrated embodiment, the backpressure regulation valve 302 is disposed downstream from the bearing housing 268 and may be positioned in an opened position, a closed position, or one or more intermediate positions between the opened position and the closed position. When throttled between the opened position and the closed position, the backpressure regulation valve 302 may be utilized to backpressure the bearings in the bearing housing 268. For example, the process control system 204 may throttle the backpressure regulation valve 302 to maintain the bearing fluid within the bearing housing 268 and/for the bearing fluid in the bearing fluid discharge line 304 in a supercritical thermodynamic state.

For example, in some embodiments, the pressure in the pump portion 262 (e.g., approximately 28 MPa) may be larger than the pressure in the bearing housing 268 (e.g., approximately 21 MPa), which may be larger than the pressure upstream of the condenser 274 (e.g., approximately 8 MPa). In such instances, it may be desirable to backpressure to an intermediate pressure between the pressure in the bearing housing 268 and the pressure upstream of the condenser 274 such that the bearing fluid in the bearing housing 268 and the working fluid in the bearing fluid discharge line 304 are maintained in a supercritical state. The foregoing feature may reduce or eliminate the likelihood that erosion or cavitation of the turbopump 260 will occur due to high pressure drops present between the bearings and the low pressure side of the working fluid circuit 202, which may cause the bearing fluid to alternate between thermodynamic states. Further, it should be noted that although the backpressuring systems and methods are described with reference to the turbopump 260 herein, in other embodiments, the backpressuring systems and methods may also be utilized in other portions of the system, such as in combination with the bearings in bearing housing 238.

Further, it should be noted that in some embodiments, the bearing fluid supply source 141 may receive some or all of the bearing fluid from the working fluid circuit 202. For example, in the illustrated embodiment, the working fluid flows to the pump portion 262 of the turbopump 260 through pump inlet line 259. Once the working fluid has passed through the pump portion 262, the working fluid may flow to the bearing fluid supply source 141, as shown in FIG. 1. However, in other embodiments, the bearing fluid supply source 141 may receive the bearing fluid from another location within the working fluid circuit 202, or may receive the bearing fluid from an external source.

The start pump 280 has a pump portion 282 and a motor-drive portion 284. The start pump 280 is generally an electric motorized pump or a mechanical motorized pump, and may be a variable frequency driven pump. During operation, once a predetermined pressure, temperature, and/or flowrate of the working fluid is obtained within the working fluid circuit 202, the start pump 280 may be taken offline, idled, or turned off, and the turbopump 260 may be utilized to circulate the working fluid during the electricity generation process. The working fluid enters each of the turbopump 260 and the start pump 280 from the low pressure side of the working fluid circuit 202 and exits each of the turbopump 260 and the start pump 280 from the high pressure side of the working fluid circuit 202.

The start pump 280 may be a motorized pump, such as an electric motorized pump, a mechanical motorized pump, or other type of pump. Generally, the start pump 280 may be a variable frequency motorized drive pump and contains a pump portion 282 and a motor-drive portion 284. The motor-drive portion 284 of the start pump 280 contains a motor and a drive including a driveshaft and gears. In some examples, the motor-drive portion 284 has a variable frequency drive, such that the speed of the motor may be regulated by the drive. The pump portion 282 of the start pump 280 is driven by the motor-drive portion 284 coupled thereto. The pump portion 282 has an inlet for receiving the working fluid from the low pressure side of the working fluid circuit 202, such as from the condenser 274 and/or the working fluid storage system 290. The pump portion 282 has an outlet for releasing the working fluid into the high pressure side of the working fluid circuit 202.

Start pump inlet valve 283 and start pump outlet valve 285 may be utilized to control the flow of the working fluid passing through the start pump 180. Start pump inlet valve 283 may be fluidly coupled to the low pressure side of the working fluid circuit 202 upstream of the pump portion 282 of the start pump 280 and may be utilized to control the flowrate of the working fluid entering the inlet of the pump portion 282. Start pump outlet valve 285 may be fluidly coupled to the high pressure side of the working fluid circuit 202 downstream from the pump portion 282 of the start pump 280 and may be utilized to control the flowrate of the working fluid exiting the outlet of the pump portion 282.

The drive turbine 264 of the turbopump 260 is driven by heated working fluid, such as the working fluid flowing from the heat exchanger 150. The drive turbine 264 is fluidly coupled to the high pressure side of the working fluid circuit 202 by an inlet configured to receive the working fluid from the high pressure side of the working fluid circuit 202, such as flowing from the heat exchanger 150. The drive turbine 264 is fluidly coupled to the low pressure side of the working fluid circuit 202 by an outlet configured to release the working fluid into the low pressure side of the working fluid circuit 202.

The pump portion 262 of the turbopump 260 is driven by the driveshaft 267 coupled to the drive turbine 264. The pump portion 262 of the turbopump 260 may be fluidly coupled to the low pressure side of the working fluid circuit 202 by an inlet configured to receive the working fluid from the low pressure side of the working fluid circuit 202. The inlet of the pump portion 262 is configured to receive the working fluid from the low pressure side of the working fluid circuit 202, such as from the condenser 274 and/or the working fluid storage system 290. Also, the pump portion 262 may be fluidly coupled to the high pressure side of the working fluid circuit 202 by an outlet configured to release the working fluid into the high pressure side of the working fluid circuit 202 and circulate the working fluid within the working fluid circuit 202.

In one configuration, the working fluid released from the outlet on the drive turbine 264 is returned into the working fluid circuit 202 downstream from the recuperator 216 and upstream of the recuperator 218. In one or more embodiments, the turbopump 260, including piping and valves, is optionally disposed on a turbo pump skid 266, as depicted in FIG. 1. The turbo pump skid 266 may be disposed on or adjacent to the main process skid 212.

A drive turbine bypass valve 265 is generally coupled between and in fluid communication with a fluid line extending from the inlet on the drive turbine 264 with a fluid line extending from the outlet on the drive turbine 264. The drive turbine bypass valve 265 is generally opened to bypass the turbopump 260 while using the start pump 280 during the initial stages of generating electricity with the heat engine system 200. Once a predetermined pressure and temperature of the working fluid is obtained within the working fluid circuit 202, the drive turbine bypass valve 265 is closed and the heated working fluid is flowed through the drive turbine 264 to start the turbopump 260.

A drive turbine throttle valve 263 may be coupled between and in fluid communication with a fluid line extending from the heat exchanger 150 to the inlet on the drive turbine 264 of the turbopump 260. The drive turbine throttle valve 263 is configured to modulate the flow of the heated working fluid into the drive turbine 264, which in turn may be utilized to adjust the flow of the working fluid throughout the working fluid circuit 202. Additionally, valve 293 may be utilized to provide back pressure for the drive turbine 264 of the turbopump 260.

A drive turbine attemperator valve 295 may be fluidly coupled to the working fluid circuit 202 via an attemperator bypass line 291 disposed between the outlet on the pump portion 262 of the turbopump 260 and the inlet on the drive turbine 264 and/or disposed between the outlet on the pump portion 282 of the start pump 280 and the inlet on the drive turbine 264. The attemperator bypass line 291 and the drive turbine attemperator valve 295 may be configured to flow the working fluid from the pump portion 262 or 282, around the recuperator 218 and the heat exchanger 150 to avoid such components, and to the drive turbine 264, such as during a warm-up or cool-down step of the turbopump 260. The attemperator bypass line 291 and the drive turbine attemperator valve 295 may be utilized to warm the working fluid with the drive turbine 264 while avoiding the thermal heat from the heat source stream 110 via the heat exchangers, such as the heat exchanger 150.

In another embodiment, the heat engine system 200 depicted in FIG. 1 has two pairs of turbine attemperator lines and valves, such that each pair of attemperator line and valve is fluidly coupled to the working fluid circuit 202 and disposed upstream of a respective turbine inlet, such as a drive turbine inlet and a power turbine inlet. The power turbine attemperator line 211 and the power turbine attemperator valve 223 are fluidly coupled to the working fluid circuit 202 and disposed upstream of a turbine inlet on the power turbine 264. Similarly, the drive turbine attemperator line 291 and the drive turbine attemperator valve 295 are fluidly coupled to the working fluid circuit 202 and disposed upstream of a turbine inlet on the turbopump 260.

The power turbine attemperator valve 223 and the drive turbine attemperator valve 295 may be utilized during a startup and/or shutdown procedure of the heat engine system 200 to control backpressure within the working fluid circuit 202. Also, the power turbine attemperator valve 223 and the drive turbine attemperator valve 295 may be utilized during a startup and/or shutdown procedure of the heat engine system 200 to cool hot flow of the working fluid from heat saturated heat exchangers, such as heat exchangers 120, 130, 140, and/or 150, coupled to and in thermal communication with working fluid circuit 202. The power turbine attemperator valve 223 may be modulated, adjusted, or otherwise controlled to manage the inlet temperature $T_1$ and/or the inlet pressure at (or upstream from) the inlet of the power turbine 228, and to cool the heated working fluid flowing from the outlet of the heat exchanger 120. Similarly, the drive turbine attemperator valve 295 may be modulated, adjusted, or otherwise controlled to manage the inlet temperature and/or the inlet pressure at (or upstream from) the inlet of the drive turbine 264, and to cool the heated working fluid flowing from the outlet of the heat exchanger 150.

In some embodiments, the drive turbine attemperator valve 295 may be modulated, adjusted, or otherwise controlled with the process control system 204 to decrease the inlet temperature of the drive turbine 264 by increasing the flowrate of the working fluid passing through the attemperator bypass line 291 and the drive turbine attemperator valve 295 and detecting a desirable value of the inlet temperature of the drive turbine 264 via the process control system 204. The desirable value is generally at or less than the predetermined threshold value of the inlet temperature of the drive turbine 264. In some examples, such as during startup of the turbopump 260, the desirable value for the inlet temperature upstream of the drive turbine 264 may be about 150° C. or less. In other examples, such as during an energy conversion process, the desirable value for the inlet temperature upstream of the drive turbine 264 may be about 170° C. or less, such as about 168° C. or less. The drive turbine 264 and/or components therein may be damaged if the inlet temperature is about 168° C. or greater.

In some embodiments, the working fluid may flow through the attemperator bypass line 291 and the drive turbine attemperator valve 295 to bypass the heat exchanger 150. This flow of the working fluid may be adjusted with throttle valve 263 to control the inlet temperature of the drive turbine 264. During the startup of the turbopump 260, the desirable value for the inlet temperature upstream of the drive turbine 264 may be about 150° C. or less. As power is increased, the inlet temperature upstream of the drive turbine 264 may be raised to optimize cycle efficiency and operability by reducing the flow through the attemperator bypass line 291. At full power, the inlet temperature upstream of the drive turbine 264 may be about 340° C. or greater and the flow of the working fluid bypassing the heat exchanger 150 through the attemperator bypass line 291 ceases, such as approaches about 0 kg/s, in some examples. Also, the pressure may range from about 14 MPa to about 23.4 MPa as the flow of the working fluid may be within a range from about 0 kg/s to about 32 kg/s depending on power level.

A control valve 261 may be disposed downstream from the outlet of the pump portion 262 of the turbopump 260 and the control valve 281 may be disposed downstream from the outlet of the pump portion 282 of the start pump 280. Control valves 261 and 281 are flow control safety valves and generally utilized to regulate the directional flow or to prohibit backflow of the working fluid within the working fluid circuit 202. Control valve 261 is configured to prevent the working fluid from flowing upstream of or into the outlet of the pump portion 262 of the turbopump 260. Similarly, control valve 281 is configured to prevent the working fluid from flowing upstream of or into the outlet of the pump portion 282 of the start pump 280.

The drive turbine throttle valve 263 is fluidly coupled to the working fluid circuit 202 upstream of the inlet of the drive turbine 264 of the turbopump 260 and configured to control a flow of the working fluid flowing into the drive turbine 264. The power turbine bypass valve 219 is fluidly coupled to the power turbine bypass line 208 and configured to modulate, adjust, or otherwise control the working fluid flowing through the power turbine bypass line 208 for controlling the flowrate of the working fluid entering the power turbine 228.

The power turbine bypass line 208 is fluidly coupled to the working fluid circuit 202 at a point upstream of an inlet of the power turbine 228 and at a point downstream from an outlet of the power turbine 228. The power turbine bypass line 208 is configured to flow the working fluid around and avoid the power turbine 228 when the power turbine bypass valve 219 is in an opened position. The flowrate and the pressure of the working fluid flowing into the power turbine 228 may be reduced or stopped by adjusting the power turbine bypass valve 219 to the opened position. Alternatively, the flowrate and the pressure of the working fluid flowing into the power turbine 228 may be increased or started by adjusting the power turbine bypass valve 219 to the closed position due to the backpressure formed through the power turbine bypass line 208.

The power turbine bypass valve 219 and the drive turbine throttle valve 263 may be independently controlled by the process control system 204 that is communicably connected, wired and/or wirelessly, with the power turbine bypass valve 219, the drive turbine throttle valve 263, and other parts of the heat engine system 200. The process control system 204 is operatively connected to the working fluid circuit 202 and a mass management system 270 and is enabled to monitor and control multiple process operation parameters of the heat engine system 200.

In one or more embodiments, the working fluid circuit 202 provides a bypass flowpath for the start pump 280 via the start pump bypass line 224 and a start pump bypass valve 254, as well as a bypass flowpath for the turbopump 260 via the turbo pump bypass line 226 and a turbo pump bypass valve 256. One end of the start pump bypass line 224 is fluidly coupled to an outlet of the pump portion 282 of the start pump 280, and the other end of the start pump bypass line 224 is fluidly coupled to a fluid line 229. Similarly, one end of a turbo pump bypass line 226 is fluidly coupled to an outlet of the pump portion 262 of the turbopump 260 and the other end of the turbo pump bypass line 226 is coupled to the start pump bypass line 224. In some configurations, the start pump bypass line 224 and the turbo pump bypass line 226 merge together as a single line upstream of coupling to a fluid line 229. The fluid line 229 extends between and is fluidly coupled to the recuperator 218 and the condenser 274. The start pump bypass valve 254 is disposed along the start pump bypass line 224 and fluidly coupled between the low pressure side and the high pressure side of the working fluid circuit 202 when in a closed position. Similarly, the turbo pump bypass valve 256 is disposed along the turbo pump bypass line 226 and fluidly coupled between the low pressure side and the high pressure side of the working fluid circuit 202 when in a closed position.

FIG. 1 further depicts a power turbine throttle valve 250 fluidly coupled to a bypass line 246 on the high pressure side of the working fluid circuit 202 and upstream of the heat exchanger 120, as disclosed by at least one embodiment described herein. The power turbine throttle valve 250 is fluidly coupled to the bypass line 246 and configured to modulate, adjust, or otherwise control the working fluid flowing through the bypass line 246 for controlling a general coarse flowrate of the working fluid within the working fluid circuit 202. The bypass line 246 is fluidly coupled to the working fluid circuit 202 at a point upstream of the valve 293 and at a point downstream from the pump portion 282 of the start pump 280 and/or the pump portion 262 of the turbopump 260.

Additionally, a power turbine trim valve 252 is fluidly coupled to a bypass line 248 on the high pressure side of the working fluid circuit 202 and upstream of the heat exchanger 150, as disclosed by another embodiment described herein. The power turbine trim valve 252 is fluidly coupled to the bypass line 248 and configured to modulate, adjust, or otherwise control the working fluid flowing through the bypass line 248 for controlling a fine flowrate of the working fluid within the working fluid circuit 202. The bypass line 248 is fluidly coupled to the bypass line 246 at a point upstream of the power turbine throttle valve 250 and at a point downstream from the power turbine throttle valve 250.

The heat engine system 200 further contains a drive turbine throttle valve 263 fluidly coupled to the working fluid circuit 202 upstream of the inlet of the drive turbine 264 of the turbopump 260 and configured to modulate a flow of the working fluid flowing into the drive turbine 264, a power turbine bypass line 208 fluidly coupled to the working fluid circuit 202 upstream of an inlet of the power turbine 228, fluidly coupled to the working fluid circuit 202 downstream from an outlet of the power turbine 228, and configured to flow the working fluid around and avoid the power turbine 228, a power turbine bypass valve 219 fluidly coupled to the power turbine bypass line 208 and configured to modulate a flow of the working fluid flowing through the power turbine bypass line 208 for controlling the flowrate of the working fluid entering the power turbine 228, and the process control system 204 operatively connected to the heat engine system 200, wherein the process control system 204 is configured to adjust the drive turbine throttle valve 263 and the power turbine bypass valve 219.

A heat exchanger bypass line 160 is fluidly coupled to a fluid line 131 of the working fluid circuit 202 upstream of the heat exchangers 120, 130, and/or 150 by a heat exchanger bypass valve 162, as illustrated in FIG. 1 and described in more detail below. The heat exchanger bypass valve 162 may be a solenoid valve, a hydraulic valve, an electric valve, a manual valve, or derivatives thereof. In many examples, the heat exchanger bypass valve 162 is a solenoid valve and configured to be controlled by the process control system 204. Regardless of the valve type, however, the valve may be controlled to route the working fluid in a manner that maintains the temperature of the working fluid at a level appropriate for the current operational state of the heat engine system. For example, the bypass valve may be regulated during startup to control the flow of the working fluid through a reduced quantity of heat exchangers to effectuate a lower working fluid temperature than would be achieved during a fully operational state when the working fluid is routed through all the heat exchangers.

In one or more embodiments, the working fluid circuit 202 provides release valves 213a, 213b, 213c, and 213d, as well as release outlets 214a, 214b, 214c, and 214d, respectively in fluid communication with each other. Generally, the release valves 213a, 213b, 213c, and 213d remain closed during the electricity generation process, but may be configured to automatically open to release an over-pressure at a predetermined value within the working fluid. Once the working fluid flows through the valve 213a, 213b, 213c, or 213d, the working fluid is vented through the respective release outlet 214a, 214b, 214c, or 214d. The release outlets 214a, 214b, 214c, and 214d may provide passage of the working fluid into the ambient surrounding atmosphere. Alternatively, the release outlets 214a, 214b, 214c, and 214d may provide passage of the working fluid into a recycling or reclamation step that generally includes capturing, condensing, and storing the working fluid.

The release valve 213a and the release outlet 214a are fluidly coupled to the working fluid circuit 202 at a point disposed between the heat exchanger 120 and the power turbine 228. The release valve 213b and the release outlet 214b are fluidly coupled to the working fluid circuit 202 at a point disposed between the heat exchanger 150 and the drive turbine 264 of the turbopump 260. The release valve 213c and the release outlet 214c are fluidly coupled to the working fluid circuit 202 via a bypass line that extends from a point between the valve 293 and the pump portion 262 of the turbopump 260 to a point on the turbo pump bypass line 226 between the turbo pump bypass valve 256 and the fluid line 229. The release valve 213d and the release outlet 214d are fluidly coupled to the working fluid circuit 202 at a point disposed between the recuperator 218 and the condenser 274.

A computer system 206, as part of the process control system 204, contains a multi-controller algorithm utilized to control the drive turbine throttle valve 263, the power turbine bypass valve 219, the heat exchanger bypass valve 162, the power turbine throttle valve 250, the power turbine trim valve 252, the backpressure regulation valve 302, as well as other valves, pumps, and sensors within the heat engine system 200. In one embodiment, the process control system 204 is enabled to move, adjust, manipulate, or otherwise control the backpressure regulation valve 302 for adjusting or controlling the backpressure along the bearing fluid discharge line 304 of the turbopump 260. By controlling the position of the backpressure regulation valve 302, the process control system 204 is also operable to reduce or prevent the likelihood that the fluid in the bearing fluid discharge line 304 has varied from a desired thermodynamic state, thus reducing or preventing the likelihood of cavitation or erosion in the turbopump 260.

In some embodiments, the process control system 204 is communicably connected, wired and/or wirelessly, with numerous sets of sensors, valves, and pumps, in order to process the measured and reported temperatures, pressures, and mass flowrates of the working fluid at the designated points within the working fluid circuit 202. In response to these measured and/or reported parameters, the process control system 204 may be operable to selectively adjust the valves in accordance with a control program or algorithm, thereby maximizing operation of the heat engine system 200.

Further, in certain embodiments, the process control system 204, as well as any other controllers or processors disclosed herein, may include one or more non-transitory, tangible, machine-readable media, such as read-only memory (ROM), random access memory (RAM), solid state memory (e.g., flash memory), floppy diskettes, CD-ROMs, hard drives, universal serial bus (USB) drives, any other computer readable storage medium, or any combination thereof. The storage media may store encoded instructions, such as firmware, that may be executed by the process control system 204 to operate the logic or portions of the logic presented in the methods disclosed herein. For example, in certain embodiments, the heat engine system 200 may include computer code disposed on a computer-readable storage medium or a process controller that includes such a computer-readable storage medium. The computer code may include instructions for initiating a control function to alternate the position of the backpressure regulation valve 302 between an opened position and a closed position to control the thermodynamic state of the working fluid in the bearing fluid discharge line 304.

In some embodiments, the process control system 204 contains a control algorithm embedded in a computer system 206, which may include one or more control circuits, and the control algorithm contains a governing loop controller. The governing controller is generally utilized to adjust values throughout the working fluid circuit 202 for controlling the temperature, pressure, flowrate, and/or mass of the working fluid at specified points therein. In some embodiments, the governing loop controller may be configured to maintain desirable threshold values for the inlet temperature and the inlet pressure by modulating, adjusting, or otherwise controlling the drive turbine attemperator valve 295 and the drive turbine throttle valve 263. In other embodiments, the governing loop controller may be configured to maintain desirable threshold values for the inlet temperature by modulating, adjusting, or otherwise controlling the power turbine attemperator valve 223 and the power turbine throttle valve 250.

The process control system 204 may operate with the heat engine system 200 semi-passively with the aid of several sets of sensors. The first set of sensors may be arranged at or adjacent the suction inlet of the turbopump 260 and the start pump 280, and the second set of sensors may be arranged at or adjacent the outlet of the turbopump 260 and the start pump 280. The first and second sets of sensors monitor and report the pressure, temperature, mass flowrate, or other properties of the working fluid within the low and high pressure sides of the working fluid circuit 202 adjacent the turbopump 260 and the start pump 280. The third set of sensors may be arranged either inside or adjacent the working fluid storage vessel 292 of the working fluid storage system 290 to measure and report the pressure, temperature, mass flowrate, or other properties of the working fluid within the working fluid storage vessel 292. Additionally, an instrument air supply (not shown) may be coupled to sensors, devices, or other instruments within the heat engine system 200 including the mass management system 270 and/or other system components that may utilize a gaseous supply, such as nitrogen or air.

In some embodiments, the overall efficiency of the heat engine system 200 and the amount of power ultimately generated can be influenced by the inlet or suction pressure at the pump when the working fluid contains supercritical carbon dioxide. In order to minimize or otherwise regulate the suction pressure of the pump, the heat engine system 200 may incorporate the use of a mass management system ("MMS") 270. The mass management system 270 controls the inlet pressure of the start pump 280 by regulating the amount of working fluid entering and/or exiting the heat engine system 200 at strategic locations in the working fluid circuit 202, such as at tie-in points, inlets/outlets, valves, or conduits throughout the heat engine system 200. Consequently, the heat engine system 200 becomes more efficient by increasing the pressure ratio for the start pump 280 to a maximum possible extent.

The mass management system 270 contains at least one vessel or tank, such as a storage vessel (e.g., working fluid storage vessel 292), a fill vessel, and/or a mass control tank (e.g., mass control tank 286), fluidly coupled to the low pressure side of the working fluid circuit 202 via one or more valves, such as valve 287. The valves are moveable—as being partially opened, fully opened, and/or closed—to either remove working fluid from the working fluid circuit 202 or add working fluid to the working fluid circuit 202. Exemplary embodiments of the mass management system 270, and a range of variations thereof, are found in U.S. application Ser. No. 13/278,705, filed Oct. 21, 2011, published as U.S. Pub. No. 2012-0047892, and issued as U.S. Pat. No. 8,613,195, the contents of which are incorporated herein by reference to the extent consistent with the present disclosure. Briefly, however, the mass management system 270 may include a plurality of valves and/or connection points, each in fluid communication with the mass control tank 286. The valves may be characterized as termination points where the mass management system 270 is operatively connected to the heat engine system 200. The connection points and valves may be configured to provide the mass management system 270 with an outlet for flaring excess working fluid or pressure, or to provide the mass management system 270 with additional/supplemental working fluid from an external source, such as a fluid fill system.

In some embodiments, the mass control tank 286 may be configured as a localized storage tank for additional/supplemental working fluid that may be added to the heat engine system 200 when needed in order to regulate the pressure or temperature of the working fluid within the working fluid circuit 202 or otherwise supplement escaped working fluid. By controlling the valves, the mass management system 270 adds and/or removes working fluid mass to/from the heat engine system 200 with or without the need of a pump, thereby reducing system cost, complexity, and maintenance.

In some examples, a working fluid storage vessel 292 is part of a working fluid storage system 290 and is fluidly coupled to the working fluid circuit 202. At least one connection point, such as a working fluid feed 288, may be a fluid fill port for the working fluid storage vessel 292 of the working fluid storage system 290 and/or the mass management system 270. Additional or supplemental working fluid may be added to the mass management system 270 from an external source, such as a fluid fill system via the working fluid feed 288. Exemplary fluid fill systems are described and illustrated in U.S. Pat. No. 8,281,593, the contents of which are incorporated herein by reference to the extent consistent with the present disclosure.

In another embodiment described herein, bearing gas and seal gas may be supplied to the turbopump 260 or other devices contained within and/or utilized along with the heat engine system 200. One or multiple streams of bearing gas and/or seal gas may be derived from the working fluid within the working fluid circuit 202 and contain carbon dioxide in a gaseous, subcritical, or supercritical state.

In some examples, the bearing gas or fluid is flowed by the start pump 280, from a bearing gas supply 296a and/or a bearing gas supply 296b, into the working fluid circuit 202, through a bearing gas supply line (not shown), and to the bearings within the power generation system 220. In other examples, the bearing gas or fluid is flowed by the start pump 280, from the bearing gas supply 296a and/or the bearing gas supply 296b, from the working fluid circuit 202, through a bearing gas supply line (not shown), and to the bearings within the turbopump 260. The gas return 298 may be a connection point or valve that feeds into a gas system, such as a bearing gas, dry gas, seal gas, or other system.

At least one gas return 294 is generally coupled to a discharge, recapture, or return of bearing gas, seal gas, and other gases. The gas return 294 provides a feed stream into the working fluid circuit 202 of recycled, recaptured, or otherwise returned gases—generally derived from the working fluid. The gas return 294 is generally fluidly coupled to the working fluid circuit 202 upstream of the condenser 274 and downstream from the recuperator 218.

In one or more embodiments, a working fluid storage vessel 292 may be fluidly coupled to the start pump 280 via the working fluid circuit 202 within the heat engine system 200. The working fluid storage vessel 292 and the working fluid circuit 202 contain the working fluid (e.g., carbon dioxide) and the working fluid circuit 202 fluidly has a high pressure side and a low pressure side.

The heat engine system 200 further contains a bearing housing, case, or other chamber, such as the bearing housings 238 and 268, fluidly coupled to and/or substantially encompassing or enclosing bearings within power generation system 220 and the turbine pump 260, respectively. In one embodiment, the turbopump 260 contains the drive turbine 264, the pump portion 262, and the bearing housing 268 fluidly coupled to and/or substantially encompassing or enclosing the bearings. The turbopump 260 further may contain a gearbox and/or a driveshaft 267 coupled between the drive turbine 264 and the pump portion 262. In another embodiment, the power generation system 220 contains the power turbine 228, the power generator 240, and the bearing housing 238 substantially encompassing or enclosing the bearings. The power generation system 220 further contains a gearbox 232 and a driveshaft 230 coupled between the power turbine 228 and the power generator 240.

Exemplary structures of the bearing housing 238 or 268 may completely or substantially encompass or enclose the bearings as well as all or part of turbines, generators, pumps, driveshafts, gearboxes, or other components shown or not shown for heat engine system 200. The bearing housing 238 or 268 may completely or partially include structures, chambers, cases, housings, such as turbine housings, generator housings, driveshaft housings, driveshafts that contain bearings, gearbox housings, derivatives thereof, or combinations thereof. FIG. 1 depicts the bearing housing 268 fluidly coupled to and/or containing all or a portion of the drive turbine 264, the pump portion 262, and the driveshaft 267 of the turbopump 260. In other examples, the housing of the drive turbine 264 and the housing of the pump portion 262 may be independently coupled to and/or form portions of the bearing housing 268. Similarly, the bearing housing 238 may be fluidly coupled to and/or contain all or a portion of the power turbine 228, the power generator 240, the driveshaft 230, and the gearbox 232 of the power generation system 220. In some examples, the housing of the power turbine 228 is coupled to and/or forms a portion of the bearing housing 238.

In one or more embodiments disclosed herein, the heat engine system 200 depicted in FIG. 1 is configured to monitor and maintain the working fluid within the low pressure side of the working fluid circuit 202 in a supercritical state during a startup procedure. The working fluid may be maintained in a supercritical state by adjusting or otherwise controlling a pump suction pressure upstream of an inlet on the pump portion 262 of the turbopump 260 via the process control system 204 operatively connected to the working fluid circuit 202.

The process control system 204 may be utilized to maintain, adjust, or otherwise control the pump suction pressure at or greater than the critical pressure of the working fluid during the startup procedure. The working fluid may be kept in a liquid-type or supercritical state and free or substantially free of the gaseous state within the low pressure side of the working fluid circuit 202. Therefore, the pump system, including the turbopump 260 and/or the start pump 280, may avoid pump cavitation within the respective pump portions 262 and 282.

In some embodiments, the types of working fluid that may be circulated, flowed, or otherwise utilized in the working fluid circuit 202 of the heat engine system 200 include carbon oxides, hydrocarbons, alcohols, ketones, halogenated hydrocarbons, ammonia, amines, aqueous, or combinations thereof. Exemplary working fluids used in the heat engine system 200 include carbon dioxide, ammonia, methane, ethane, propane, butane, ethylene, propylene, butylene, acetylene, methanol, ethanol, acetone, methyl ethyl ketone, water, derivatives thereof, or mixtures thereof. Halogenated hydrocarbons may include hydrochlorofluorocarbons (HCFCs), hydrofluorocarbons (HFCs) (e.g., 1,1,1,3,3-pentafluoropropane (R245fa)), fluorocarbons, derivatives thereof, or mixtures thereof.

In many embodiments described herein, the working fluid circulated, flowed, or otherwise utilized in the working fluid circuit 202 of the heat engine system 200, and the other exemplary circuits disclosed herein, may be or may contain carbon dioxide ($CO_2$) and mixtures containing carbon dioxide. Generally, at least a portion of the working fluid circuit 202 contains the working fluid in a supercritical state (e.g., sc-$CO_2$). Carbon dioxide utilized as the working fluid or contained in the working fluid for power generation cycles has many advantages over other compounds typically used as working fluids, since carbon dioxide has the properties of being non-toxic and non-flammable and is also easily available and relatively inexpensive. Due in part to a relatively high working pressure of carbon dioxide, a carbon dioxide system may be much more compact than systems using other working fluids. The high density and volumetric heat capacity of carbon dioxide with respect to other working fluids makes carbon dioxide more "energy dense" meaning that the size of all system components can be considerably reduced without losing performance. It should be noted that use of the terms carbon dioxide ($CO_2$), supercritical carbon dioxide (sc-$CO_2$), or subcritical carbon dioxide (sub-$CO_2$) is not intended to be limited to carbon dioxide of any particular type, source, purity, or grade. For example, industrial grade carbon dioxide may be contained in and/or used as the working fluid without departing from the scope of the disclosure.

In other exemplary embodiments, the working fluid in the working fluid circuit 202 may be a binary, ternary, or other working fluid blend. The working fluid blend or combination can be selected for the unique attributes possessed by the fluid combination within a heat recovery system, as described herein. For example, one such fluid combination includes a liquid absorbent and carbon dioxide mixture enabling the combined fluid to be pumped in a liquid state to high pressure with less energy input than required to compress carbon dioxide. In another exemplary embodiment, the working fluid may be a combination of supercritical carbon dioxide (sc-$CO_2$), subcritical carbon dioxide (sub-$CO_2$), and/or one or more other miscible fluids or chemical compounds. In yet other exemplary embodiments, the working fluid may be a combination of carbon dioxide and propane, or carbon dioxide and ammonia, without departing from the scope of the disclosure.

The working fluid circuit 202 generally has a high pressure side, a low pressure side, and a working fluid circulated within the working fluid circuit 202. The use of the term "working fluid" is not intended to limit the state or phase of matter of the working fluid. For instance, the working fluid or portions of the working fluid may be in a fluid phase, a gas phase, a supercritical state, a subcritical state, or any other phase or state at any one or more points within the heat engine system 200 or thermodynamic cycle. In one or more embodiments, the working fluid is in a supercritical state over certain portions of the working fluid circuit 202 of the heat engine system 200 (e.g., a high pressure side) and in a subcritical state over other portions of the working fluid circuit 202 of the heat engine system 200 (e.g., a low pressure side).

In other embodiments, the entire thermodynamic cycle may be operated such that the working fluid is maintained in either a supercritical or subcritical state throughout the entire working fluid circuit 202 of the heat engine system 200. During different stages of operation, the high and low pressure sides the working fluid circuit 202 for the heat engine system 200 may contain the working fluid in a supercritical and/or subcritical state. For example, the high and low pressure sides of the working fluid circuit 202 may both contain the working fluid in a supercritical state during the startup procedure. However, once the system is synchronizing, load ramping, and/or fully loaded, the high pressure side of the working fluid circuit 202 may keep the working fluid in a supercritical state while the low pressure side the working fluid circuit 202 may be adjusted to contain the working fluid in a subcritical state or other liquid-type state.

Generally, the high pressure side of the working fluid circuit 202 contains the working fluid (e.g., sc-$CO_2$) at a pressure of about 15 MPa or greater, such as about 17 MPa or greater or about 20 MPa or greater. In some examples, the high pressure side of the working fluid circuit 202 may have a pressure within a range from about 15 MPa to about 30 MPa, more narrowly within a range from about 16 MPa to about 26 MPa, more narrowly within a range from about 17 MPa to about 25 MPa, and more narrowly within a range from about 17 MPa to about 24 MPa, such as about 23.3 MPa. In other examples, the high pressure side of the working fluid circuit 202 may have a pressure within a range from about 20 MPa to about 30 MPa, more narrowly within a range from about 21 MPa to about 25 MPa, and more narrowly within a range from about 22 MPa to about 24 MPa, such as about 23 MPa.

The low pressure side of the working fluid circuit 202 contains the working fluid (e.g., $CO_2$ or sub-$CO_2$) at a pressure of less than 15 MPa, such as about 12 MPa or less, or about 10 MPa or less. In some examples, the low pressure side of the working fluid circuit 202 may have a pressure within a range from about 4 MPa to about 14 MPa, more narrowly within a range from about 6 MPa to about 13 MPa, more narrowly within a range from about 8 MPa to about 12 MPa, and more narrowly within a range from about 10 MPa to about 11 MPa, such as about 10.3 MPa. In other examples, the low pressure side of the working fluid circuit 202 may have a pressure within a range from about 2 MPa to about 10 MPa, more narrowly within a range from about 4 MPa to about 8 MPa, and more narrowly within a range from about 5 MPa to about 7 MPa, such as about 6 MPa.

In some examples, the high pressure side of the working fluid circuit 202 may have a pressure within a range from about 17 MPa to about 23.5 MPa, and more narrowly within a range from about 23 MPa to about 23.3 MPa, while the low pressure side of the working fluid circuit 202 may have a pressure within a range from about 8 MPa to about 11 MPa, and more narrowly within a range from about 10.3 MPa to about 11 MPa.

Referring generally to FIG. 1, the heat engine system 200 includes the power turbine 228 disposed between the high pressure side and the low pressure side of the working fluid circuit 202, disposed downstream from the heat exchanger 120, and fluidly coupled to and in thermal communication with the working fluid. The power turbine 228 is configured to convert a pressure drop in the working fluid to mechanical energy whereby the absorbed thermal energy of the working fluid is transformed to mechanical energy of the power turbine 228. Therefore, the power turbine 228 is an expansion device capable of transforming a pressurized fluid into mechanical energy, generally, transforming high temperature and pressure fluid into mechanical energy, such as rotating a shaft (e.g., the driveshaft 230).

The power turbine 228 may contain or be a turbine, a turbo, an expander, or another device for receiving and expanding the working fluid discharged from the heat exchanger 120. The power turbine 228 may have an axial construction or radial construction and may be a single-staged device or a multi-staged device. Exemplary turbine devices that may be utilized in the power turbine 228 include an expansion device, a geroler, a gerotor, a valve, other types of positive displacement devices such as a pressure swing, a turbine, a turbo, or any other device capable of transforming a pressure or pressure/enthalpy drop in a working fluid into mechanical energy. A variety of expanding devices are capable of working within the inventive system and achieving different performance properties that may be utilized as the power turbine 228.

Figure 2:
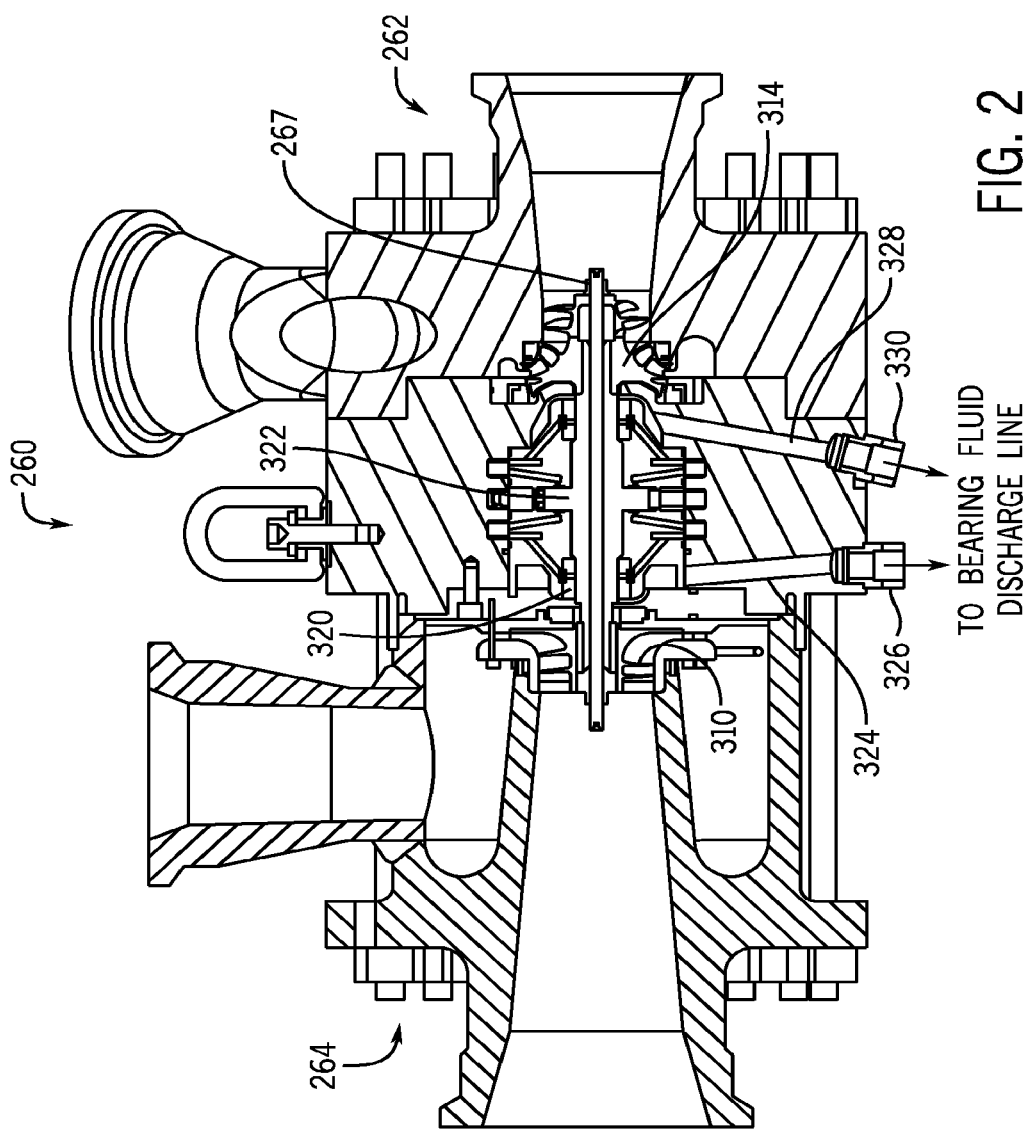
FIG. 2 is a cross sectional view of a turbopump assembly, according to one or more embodiments disclosed herein.

The power turbine 228 is generally coupled to the power generator 240 by the driveshaft 230. A gearbox 232 is generally disposed between the power turbine 228 and the power generator 240 and adjacent or encompassing the driveshaft 230. The driveshaft 230 may be a single piece or may contain two or more pieces coupled together. In one example, as depicted in FIG. 2, a first segment of the driveshaft 230 extends from the power turbine 228 to the gearbox 232, a second segment of the driveshaft 230 extends from the gearbox 232 to the power generator 240, and multiple gears are disposed between and couple to the two segments of the driveshaft 230 within the gearbox 232.

In some configurations, the heat engine system 200 also provides for the delivery of a portion of the working fluid, seal gas, bearing gas, air, or other gas into a chamber or housing, such as a housing 238 within the power generation system 220 for purposes of cooling one or more parts of the power turbine 228. In other configurations, the driveshaft 230 includes a seal assembly (not shown) designed to prevent or capture any working fluid leakage from the power turbine 228. Additionally, a working fluid recycle system may be implemented along with the seal assembly to recycle seal gas back into the working fluid circuit 202 of the heat engine system 200.

The power generator 240 may be a generator, an alternator (e.g., permanent magnet alternator), or other device for generating electrical energy, such as transforming mechanical energy from the driveshaft 230 and the power turbine 228 to electrical energy. A power outlet 242 may be electrically coupled to the power generator 240 and configured to transfer the generated electrical energy from the power generator 240 and to an electrical grid 244. The electrical grid 244 may be or include an electrical grid, an electrical bus (e.g., plant bus), power electronics, other electric circuits, or combinations thereof. The electrical grid 244 generally contains at least one alternating current bus, alternating current grid, alternating current circuit, or combinations thereof. In one example, the power generator 240 is a generator and is electrically and operably connected to the electrical grid 244 via the power outlet 242. In another example, the power generator 240 is an alternator and is electrically and operably connected to power electronics (not shown) via the power outlet 242. In another example, the power generator 240 is electrically connected to power electronics which are electrically connected to the power outlet 242.

The power electronics may be configured to convert the electrical power into desirable forms of electricity by modifying electrical properties, such as voltage, current, or frequency. The power electronics may include converters or rectifiers, inverters, transformers, regulators, controllers, switches, resisters, storage devices, and other power electronic components and devices. In other embodiments, the power generator 240 may contain, be coupled with, or be other types of load receiving equipment, such as other types of electrical generation equipment, rotating equipment, a gearbox (e.g., gearbox 232), or other device configured to modify or convert the shaft work created by the power turbine 228. In one embodiment, the power generator 240 is in fluid communication with a cooling loop having a radiator and a pump for circulating a cooling fluid, such as water, thermal oils, and/or other suitable refrigerants. The cooling loop may be configured to regulate the temperature of the power generator 240 and power electronics by circulating the cooling fluid to draw away generated heat.

The heat engine system 200 also provides for the delivery of a portion of the working fluid into a chamber or housing of the power turbine 228 for purposes of cooling one or more parts of the power turbine 228. In one embodiment, due to the potential need for dynamic pressure balancing within the power generator 240, the selection of the site within the heat engine system 200 from which to obtain a portion of the working fluid is critical because introduction of this portion of the working fluid into the power generator 240 should respect or not disturb the pressure balance and stability of the power generator 240 during operation. Therefore, the pressure of the working fluid delivered into the power generator 240 for purposes of cooling is the same or substantially the same as the pressure of the working fluid at an inlet of the power turbine 228. The working fluid is conditioned to be at a desired temperature and pressure prior to being introduced into the power turbine 228. A portion of the working fluid, such as the spent working fluid, exits the power turbine 228 at an outlet of the power turbine 228 and is directed to one or more heat exchangers or recuperators, such as recuperators 216 and 218. The recuperators 216 and 218 may be fluidly coupled to the working, fluid circuit 202 in series with each other. The recuperators 216 and 218 are operative to transfer thermal energy between the high pressure side and the low pressure side of the working fluid circuit 202.

In one embodiment, the recuperator 216 is fluidly coupled to the low pressure side of the working fluid circuit 202, disposed downstream from a working fluid outlet on the power turbine 228, and disposed upstream of the recuperator 218 and/or the condenser 274. The recuperator 216 is configured to remove at least a portion of thermal energy from the working fluid discharged from the power turbine 228. In addition, the recuperator 216 is also fluidly coupled to the high pressure side of the working fluid circuit 202, disposed upstream of the heat exchanger 120 and/or a working fluid inlet on the power turbine 228, and disposed downstream from the heat exchanger 130. The recuperator 216 is configured to increase the amount of thermal energy in the working fluid prior to flowing into the heat exchanger 120 and/or the power turbine 228. Therefore, the recuperator 216 is operative to transfer thermal energy between the high pressure side and the low pressure side of the working fluid circuit 202. In some examples, the recuperator 216 may be a heat exchanger configured to cool the low pressurized working fluid discharged or downstream from the power turbine 228 while heating the high pressurized working fluid entering into or upstream of the heat exchanger 120 and/or the power turbine 228.

Similarly, in another embodiment, the recuperator 218 is fluidly coupled to the low pressure side of the working fluid circuit 202, disposed downstream from a working fluid outlet on the power turbine 228 and/or the recuperator 216, and disposed upstream of the condenser 274. The recuperator 218 is configured to remove at least a portion of thermal energy from the working fluid discharged from the power turbine 228 and/or the recuperator 216. In addition, the recuperator 218 is also fluidly coupled to the high pressure side of the working fluid circuit 202, disposed upstream of the heat exchanger 150 and/or a working fluid inlet on a drive turbine 264 of turbopump 260, and disposed downstream from a working fluid outlet on the pump portion 262 of turbopump 260. The recuperator 218 is configured to increase the amount of thermal energy in the working fluid prior to flowing into the heat exchanger 150 and/or the drive turbine 264. Therefore, the recuperator 218 is operative to transfer thermal energy between the high pressure side and the low pressure side of the working fluid circuit 202. In some examples, the recuperator 218 may be a heat exchanger configured to cool the low pressurized working fluid discharged or downstream from the power turbine 228 and/or the recuperator 216 while heating the high pressurized working fluid entering into or upstream of the heat exchanger 150 and/or the drive turbine 264.

A cooler or a condenser 274 may be fluidly coupled to and in thermal communication with the low pressure side of the working fluid circuit 202 and may be configured or operative to control a temperature of the working fluid in the low pressure side of the working fluid circuit 202. The condenser 274 may be disposed downstream from the recuperators 216 and 218 and upstream of the start pump 280 and the turbopump 260. The condenser 274 receives the cooled working fluid from the recuperator 218 and further cools and/or condenses the working fluid which may be recirculated throughout the working fluid circuit 202. In many examples, the condenser 274 is a cooler and may be configured to control a temperature of the working fluid in the low pressure side of the working fluid circuit 202 by transferring thermal energy from the working fluid in the low pressure side to a cooling loop or system outside of the working fluid circuit 202.

A cooling media or fluid is generally utilized in the cooling loop or system by the condenser 274 for cooling the working fluid and removing thermal energy outside of the working fluid circuit 202. The cooling media or fluid flows through, over, or around while in thermal communication with the condenser 274. Thermal energy in the working fluid is transferred to the cooling fluid via the condenser 274. Therefore, the cooling fluid is in thermal communication with the working fluid circuit 202, but not fluidly coupled to the working fluid circuit 202. The condenser 274 may be fluidly coupled to the working fluid circuit 202 and independently fluidly coupled to the cooling fluid. The cooling fluid may contain one or multiple compounds and may be in one or multiple states of matter. The cooling fluid may be a media or fluid in a gaseous state, a liquid state, a subcritical state, a supercritical state, a suspension, a solution, derivatives thereof, or combinations thereof.

In many examples, the condenser 274 is generally fluidly coupled to a cooling loop or system (not shown) that receives the cooling fluid from a cooling fluid return 278a and returns the warmed cooling fluid to the cooling loop or system via a cooling fluid supply 278b. The cooling fluid may be water, carbon dioxide, or other aqueous and/or organic fluids (e.g., alcohols and/or glycols), air or other gases, or various mixtures thereof that is maintained at a lower temperature than the temperature of the working fluid. In other examples, the cooling media or fluid contains air or another gas exposed to the condenser 274, such as an air steam blown by a motorized fan or blower. A filter 276 may be disposed along and in fluid communication with the cooling fluid line at a point downstream from the cooling fluid supply 278b and upstream of the condenser 274. In some examples, the filter 276 may be fluidly coupled to the cooling fluid line within the process system 210.

Turning now to FIG. 2, illustrated therein is a cross sectional view of embodiments of the pump portion 262 and the drive turbine 264 of the turbopump 260 that are configured to be coupled via driveshaft 267. In the illustrated embodiment, the drive turbine 264 includes a turbine wheel 310, and the pump portion 262 includes a pump impeller 314, both disposed about the driveshaft 267. In some configurations, a back side of the impeller 314 of the pump portion 262 may face a back side of the turbine wheel 310, as shown in the embodiment of FIG. 2.

The turbopump 260 also includes a bearing system having one or more bearings for absorbing one or more forces during operation of the turbopump 260. For example, in the illustrated embodiment, the turbopump 260 includes hydrostatic journal bearings 320 and a hydrostatic thrust bearing 322. The bearing system also includes a first drain 324 terminating in a first fitting 326 and a second drain 328 terminating in a second fitting 330. The first and second drains 324 and 328 may receive the bearing fluid from the one or more bearings in the bearing system and may be fluidly coupled to the bearing fluid discharge line 304 via the first and second fittings 326 and 330 to drain the bearing fluid to the low pressure side of the working fluid circuit 202.

During operation, the drive turbine 264 may be powered by heated working fluid, for example, from a point downstream of the heat exchanger 150, and the turbine wheel 310 rotates to generate power that drives the impeller 314 of the pump portion 262. This rotation of the impeller 314 circulates the working fluid through the working fluid circuit 202. Further, the bearing fluid from the bearing fluid supply 141 may be directed to the hydrostatic journal bearings 320 and/or the hydrostatic thrust bearing 322 and then drained to the low pressure side of the working fluid circuit 202 via the first and second drains 324 and 328. For example, the bearing fluid may be drained to a location upstream of the condenser 274.

Figure 3:
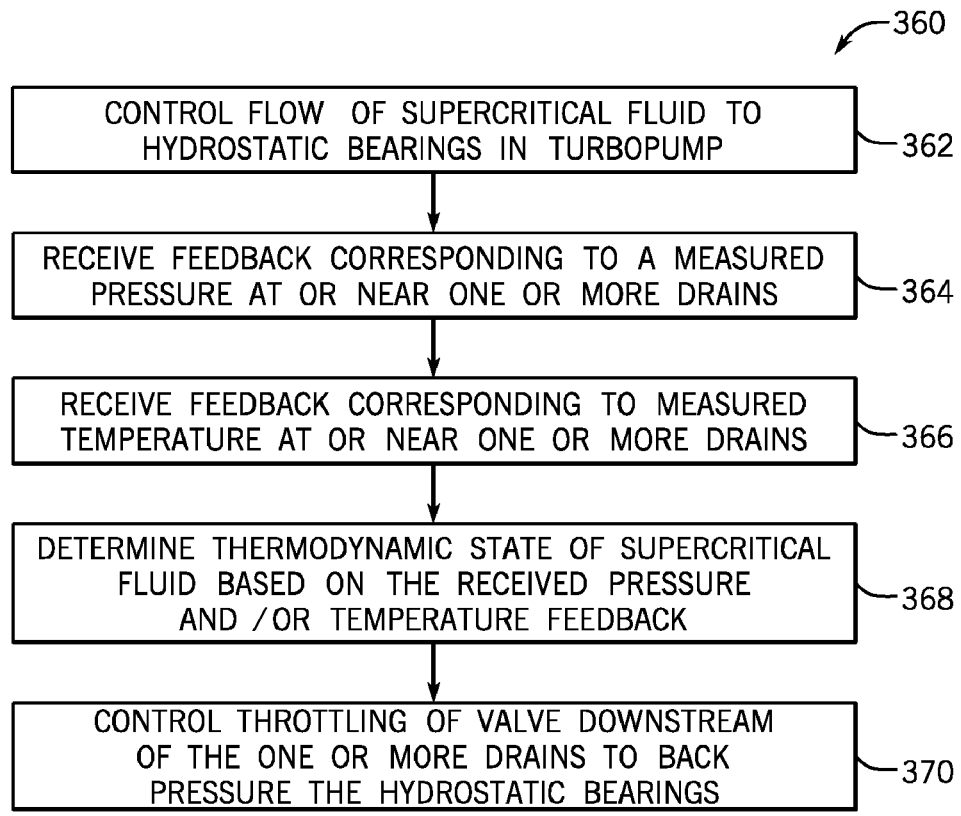
FIG. 3 is a flow chart illustrating a method for controlling the backpressure along a bearing fluid discharge line fluidly coupled to a hydrostatic bearing, according to one or more embodiments disclosed herein.

In certain embodiments, it may be desirable to maintain the bearing fluid in a supercritical state from an inlet to an outlet of the turbopump 260 to reduce or prevent the likelihood of erosion or cavitation. To that end, in some embodiments, the thermodynamic state of the bearing fluid at or near the drains 324 and 328 may be regulated by controlling the backpressure regulation valve 302 downstream of the drains 324 and 328. For example, in one embodiment, the process control system 204 may implement a method 360 shown in FIG. 3. The method 360 includes controlling the flow of a supercritical fluid to one or more hydrostatic bearings in a turbopump (block 362). For example, the process control system 204 may control the valve 144 to release bearing fluid in a supercritical state from the bearing fluid supply 141 to the hydrostatic journal bearings 320 and/or the hydrostatic thrust bearing 322.

The method 360 further includes receiving feedback corresponding to a measured pressure at or near one or more bearing fluid drains (block 364) and receiving feedback corresponding to a measured temperature at or near one or more bearing fluid drains (block 366). For example, the process control system 204 may receive feedback corresponding to the measured temperature and/or pressure at one or both of the drains 324 and 328. The method 360 also includes determining the thermodynamic state of the bearing fluid at or near the one or more bearing fluid drains based on the received temperature and/or pressure feedback (block 368) and controlling the throttling of a valve downstream of the one or more bearing fluid drains to backpressure the one or more hydrostatic bearings and maintain the bearing fluid in a supercritical state (block 370).

Figure 4:
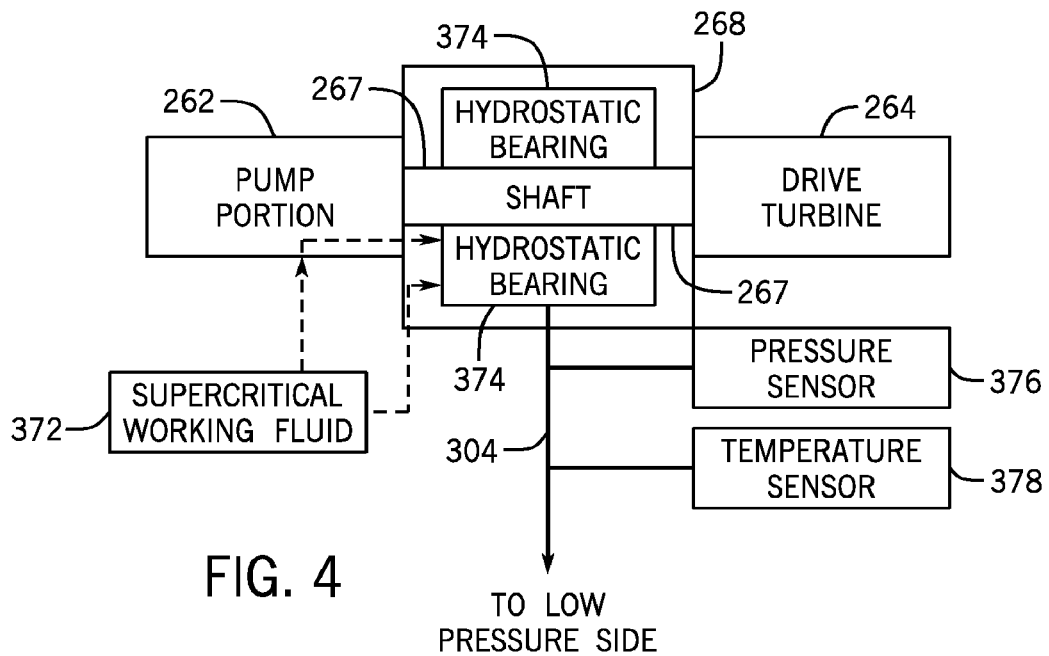
FIG. 4 is a schematic illustrating a portion of a heat engine system including a pressure sensor and a temperature sensor, according to one or more embodiments disclosed herein.

FIG. 4 is a schematic illustrating one embodiment of the turbopump 260 configured to receive a supercritical bearing fluid 372 from the pump portion 262 or directly from a bearing fluid source, according to one embodiment. In this embodiment, a pressure sensor 376 and a temperature sensor 378 are disposed along the bearing fluid discharge line 304 for measuring parameters indicative of the state of the bearing fluid along the bearing fluid discharge line 304. In some embodiments, the pressure sensor 376 and the temperature sensor 378 may be disposed along the bearing fluid discharge line 304 upstream of the backpressure regulation valve 302. The process control system 204 may utilize the feedback from the pressure sensor 376 and/or the temperature sensor 378 to determine the thermodynamic state of the bearing fluid in the bearing fluid discharge line and to control the position of the backpressure regulation valve 302 to regulate the pressure in the bearing fluid discharge line 304 in order to maintain the bearing fluid in a supercritical state.

It is to be understood that the present disclosure describes several exemplary embodiments for implementing different features, structures, or functions of the invention. Exemplary embodiments of components, arrangements, and configurations are described herein to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the present disclosure may include embodiments in which the first and second features are formed in direct contact, and may also include embodiments in which additional features may be formed interposing the first and second features, such that the first and second features may not be in direct contact. Finally, the exemplary embodiments described herein may be combined in any combination of ways, i.e., any element from one exemplary embodiment may be used in any other exemplary embodiment without departing from the scope of the disclosure.

Additionally, certain terms are used throughout the present disclosure and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Further, in the present disclosure and in the claims, the terms "including", "containing", and "comprising" are used in an open-ended fashion, and thus should be interpreted to mean "including, but not limited to". All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B", unless otherwise expressly specified herein.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

The invention claimed is:

1. A method for controlling flow of a bearing fluid to a hydrostatic bearing of a turbopump assembly, comprising:
   providing a pump having: at least one hydrostatic bearing; a bearing fluid supply source fluidly coupled to the at least one hydrostatic bearing and configured to supply a bearing fluid thereto, the supplied bearing fluid including a working fluid in a supercritical state; a bearing fluid drain; a bearing fluid discharge line fluidly coupled to the at least one hydrostatic bearing, the bearing fluid drain, a backpressure regulation valve and a to pressure sensor; wherein: the backpressure regulation valve is configured to be throttled between an opened position and a closed position, and the pressure sensor is configured to generate pressure data indicative of bearing fluid pressure in the bearing fluid discharge line;
   controlling flow of the bearing fluid to the hydrostatic bearing by:
       controlling a bearing fluid supply system to provide the bearing fluid from the bearing fluid supply source to the hydrostatic bearing;
       receiving pressure data from the pressure sensor;
       determining a thermodynamic state of the bearing fluid in the bearing fluid discharge line, based at least in part on the received pressure data; and
       throttling the backpressure regulation valve between the respective opened and closed positions to regulate a backpressure of the bearing fluid in the bearing fluid discharge line, in order to maintain therein the thermodynamic state of the working fluid that is in a supercritical state.

2. The method of claim 1, wherein controlling the bearing fluid supply system comprises actuating a bearing fluid supply valve to an opened position to enable flow of the bearing fluid to the hydrostatic bearing.

3. A turbopump system, comprising:
   a pump comprising at least one hydrostatic bearing, disposed between a high pressure side and a low pressure side of a working fluid circuit, and configured to circulate a working fluid through the working fluid circuit, wherein at least a portion of the working fluid is in a supercritical state;
   a bearing fluid supply source fluidly coupled to the at least one hydrostatic bearing and configured to supply a bearing fluid to the at least one hydrostatic bearing, wherein the bearing fluid comprises the working fluid in the supercritical state; and
   a backpressure regulation valve disposed downstream of the at least one hydrostatic bearing and fluidly coupled with a bearing fluid discharge line, the backpressure regulation valve configured to be throttled between an opened position and a closed position to regulate a backpressure of the bearing fluid along the bearing fluid discharge line to maintain the bearing fluid in the supercritical state in the bearing fluid discharge line.

4. The system of claim 3, wherein the pump comprises a bearing housing, and the at least one hydrostatic bearing is disposed in the bearing housing.

5. A turbopump system, comprising:
   a pump fluidly coupled to a working fluid circuit between a low pressure side and a high pressure side of the working fluid circuit, and being configured to circulate the working fluid within the working fluid circuit, the pump comprising at least one hydrostatic bearing configured to receive the working fluid in a supercritical state; and
   a backpressure regulation valve disposed downstream from the at least one hydrostatic bearing and fluidly coupled with a bearing fluid discharge line, the backpressure regulation valve configured to be throttled to regulate a backpressure of the working fluid along the bearing fluid discharge line to maintain the working fluid in the supercritical state in the bearing fluid discharge line.

* * * * *